(12) United States Patent
Milkovic

(10) Patent No.: US 10,613,738 B1
(45) Date of Patent: Apr. 7, 2020

(54) PULL-LOCK INTERFACE INVENTION

(71) Applicant: LendingClub Corporation, San Francisco, CA (US)

(72) Inventor: Thom Milkovic, San Francisco, CA (US)

(73) Assignee: LendingClub Corporation, San Francisco, CA (US)

( * ) Notice: Subject to any disclaimer, the term of this patent is extended or adjusted under 35 U.S.C. 154(b) by 0 days.

(21) Appl. No.: 16/390,602

(22) Filed: Apr. 22, 2019

(51) Int. Cl.
G06F 3/048 (2013.01)
G06F 3/0486 (2013.01)
G06F 3/0481 (2013.01)
G06Q 20/10 (2012.01)

(52) U.S. Cl.
CPC .......... G06F 3/0486 (2013.01); G06F 3/0481 (2013.01); G06Q 20/10 (2013.01)

(58) Field of Classification Search
CPC ...... G06F 3/0486; G06F 3/0481; G06Q 20/10
USPC ........................................................ 715/769
See application file for complete search history.

(56) References Cited

U.S. PATENT DOCUMENTS

| 9,612,740 | B2* | 4/2017 | Mesguich Havilio .. G06F 3/017 |
| 10,444,976 | B2* | 10/2019 | Nilo ...................... G06F 3/0482 |
| 10,547,570 | B2* | 1/2020 | Sirpal ................. G06F 3/04847 |
| 2014/0006967 | A1* | 1/2014 | Arumugam ............... G06F 9/54 715/748 |
| 2014/0040803 | A1* | 2/2014 | Briand .................. G06F 3/0486 715/769 |
| 2014/0096049 | A1* | 4/2014 | Vonshak ................. G06F 3/048 715/769 |
| 2015/0135111 | A1* | 5/2015 | Burckart ............... G06F 3/0486 715/769 |
| 2016/0139776 | A1* | 5/2016 | Donahue ................ G06F 9/543 715/781 |

* cited by examiner

Primary Examiner — David Phantana-angkool
(74) Attorney, Agent, or Firm — Hickman Palermo Becker Bingham LLP

(57) ABSTRACT

User interface controls are provided for transferring an asset in an intuitive and unambiguous manner. According to one embodiment, the user interface has a "source indicator" that represents the source of asset transfer, and a "target indicator" that represents a potential recipient of an asset transfer. While the source and target indicators are visibly displayed on the display of a computing device, a user transfers the asset from the source represented by the source indicator to the target indicated by the target indicator by performing a dragging operation that drags the source indicator in the direction of the target indicator. The edge of the source indicator that faces the target indicator, and the edge of the target indicator that faces the source indicator, are interlocking. That is, rather than have linear edges, the respective facing edges have non-linear shapes so that, when dragged together, the shapes interlock.

17 Claims, 16 Drawing Sheets

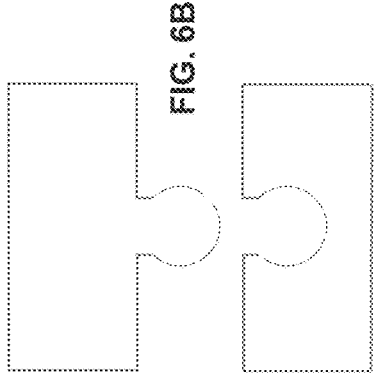
FIG. 6A
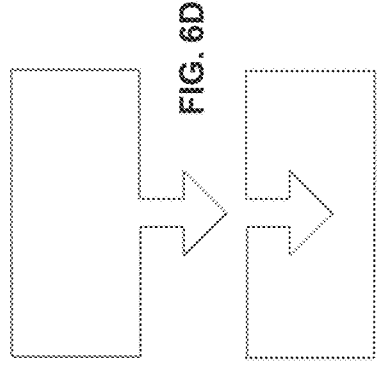
FIG. 6B
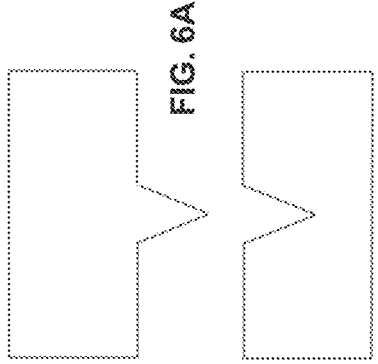
FIG. 6C
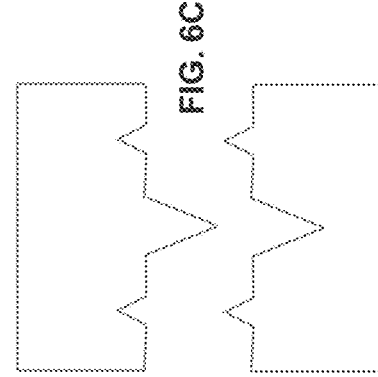
FIG. 6D
FIG. 6

US 10,613,738 B1

PULL-LOCK INTERFACE INVENTION

FIELD OF THE INVENTION

The present invention relates to interface controls for software applications and, more specifically, to pull-lock interface controls.

BACKGROUND

The controls with which a user operates a software application can be as critical as the control panel of a jet fighter. In both cases, a sub-optimal arrangement and/or design of controls can result in triggering unintended operations. Such unintended operations can produce disastrous results. For example, when a user interacts with the user interface of an application with the expectation that a particular operation will be triggered, and a different operation is actually triggered, the consequences can be (a) the deletion/loss of critical information, (b) public exposure of confidential information, (c) an unintended transfer of assets or funds, etc.

Ideally, user interface controls are such that unintended operations are never triggered. To that end, it is important that the nature of the controls is such that it is clear to a user the exact operation that will be triggered by each type of interaction. Unfortunately, for many applications, the operations that are triggered by interactions can be ambiguous and non-intuitive. When the operation involves the transfer of an asset, the formation of a contract, or any other operation that has weighty consequences, it is particularly important that the interface be as intuitive and unambiguous as possible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6A-6D are block diagram that illustrate various embodiments of locking edges between source indicators and target indicators;

DETAILED DESCRIPTION

Figure 1:
FIG. 1 is a block diagram of a computing device that may be used to perform the asset-transfer techniques described herein, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

User interface controls are provided for triggering operations that have weighty consequences. For the purpose of illustration, the interface controls shall be described in the context of transferring an asset from a source to a target in an intuitive and unambiguous manner. According to one embodiment, the user interface has a "source indicator" that represents the source of the asset transfer, and a "target indicator" that represents a potential recipient of an asset transfer. While the source and target indicators are visibly displayed on the display of a computing device, a user transfers the asset from the source represented by the source indicator to the target indicated by the target indicator by performing a dragging operation that drags the source indicator in the direction of the target indicator.

According to one embodiment, if the user releases the source indicator before the edge of the source indicator has been dragged to the edge of the target indicator, the drag operation is undone and the display reverts to its pre-dragging state. On the other hand, if the user releases the source indicator after the edge of the source indicator has reached the edge of the target indicator, the two indicators "lock" so that release of the source indicator does not cause the display to revert back to its pre-dragging state.

In one embodiment, the edge of the source indicator that faces the target indicator, and the edge of the target indicator that faces the source indicator, are interlocking. That is, rather than have linear edges, the respective facing edges have non-linear shapes such that, when dragged together, the shapes interlock. In one embodiment, the edge of the source indicator has an arrow-like edge, and the corresponding edge of the target indicator has an indentation into which the arrow-like edge can be dragged to "lock" the source indicator to the target indicator. Such an arrow-like edge serves to communicate to the user the direction toward which the source indicator must be dragged in order to trigger the asset transfer operation.

Once the locked state is achieved, the user is presented with a confirmation control. The confirmation control serves as a safety net to ensure that the action is not triggered accidentally. In one embodiment, the conformation control presents the user with information that makes clear what the effect of confirming the action will be. In alternative embodiments, for operations that involve less-weighty consequences, the action may be triggered immediately upon entering the locked state, rather than presenting a confirmation control.

Preliminary Steps

Prior to displaying user interface controls for performing an asset transfer operation, it is necessary to provide controls that allow a user to specify an intended source and an intended target for the transfer. For the purpose of illustration, it shall be assumed that the user intends to perform an asset transfer in which the asset is electronic funds, and the intended source is an "emergency fund" made available by a source entity. The "emergency fund" may represent actual funds in an account, or a loan source whose loan criteria have already been satisfied. Under these circumstances, the initial screen displayed by the asset transfer application may be that illustrated in FIG. 1.

Referring to FIG. 1, it is a block diagram of a computing device 100. While, for the purpose of explanation, examples are given herein where the computing device is a mobile phone, the techniques described herein are not limited to any particular type of computing device. For example, in alternative embodiments, computing device 100 may be a tablet, laptop, desktop computer, or any other type of computing device.

Returning again to FIG. 1, the screen of computing device 100 currently displays a source indicator 102 that consumes nearly all of the screen area. In the illustrated embodiment, the source indicator 102 includes content to communicate information about the selected source. In the present case, the selected source is an "emergency fund" and the current balance of the emergency fund is $1,000. While in this example the source indicator 102 includes a label of the source and an "amount available" indication, the actual information contained in the source indicator 102 may vary from implementation to implementation. For example, if the source is an account at a bank, the source indicator 102 may indicate the name of the bank, the account number of an account, and the name of the account holder. These are merely examples, and the techniques described herein are not limited to using any particular type of information to identify the selected source.

Figure 2:
FIG. 2 is a block diagram of a computing device illustrating a control for selecting a target for an asset transfer, according to an embodiment.

Once the source of the asset transfer operation is selected, the user is presented with controls for selecting the intended target of the asset transfer operation. According to one embodiment, a user can drag upward using control 104 to cause the source indicator 102 to shrink, and to expose a control 202 for selecting the target of the asset transfer operation, as illustrated in FIG. 2. Upon activating control 202, the application displays an interface for selecting a target of the asset transfer operation, as illustrated in FIG. 3.

Figure 3:
FIG. 3 is a block diagram of a computing device illustrating a target selection interface, according to an embodiment.

Referring to FIG. 3, it illustrates a state in which computing device 100 is displaying an interface for selecting a target for the asset transfer operation. In the illustrated embodiment, the interface has display regions for three candidate targets (i.e. Venmo, PayPal and Apple Pay), and a control for adding additional targets ("add my bank"). In the illustrated embodiment, the user may simply select the desired target by selecting the screen region that represents the target. The selection operation may be performed in a variety of ways, including but not limited to voice, touch, use of a stylus, etc. The techniques described herein are not limited to any particular manner of selecting a target.

Figure 4:
FIG. 4 is a block diagram of a computing device illustrating an interface for receiving authentication information for a selected target, according to an embodiment.

Once the desired target has been selected, the application may transition directly to the asset-transfer interface, or may transition to one or more intermediary interfaces for receiving additional information. In the present example, selecting the "Venmo" region of the interface illustrated in FIG. 3 causes the application to transition to the interface illustrated in FIG. 4, where the application requests additional information such as the Venmo user name and the Venmo password. Upon receipt of the necessary account information, the application transitions for the interface illustrated in FIG. 4 to the asset transfer interface illustrated in FIG. 5.

The Asset-Transfer Interface

Figure 5:
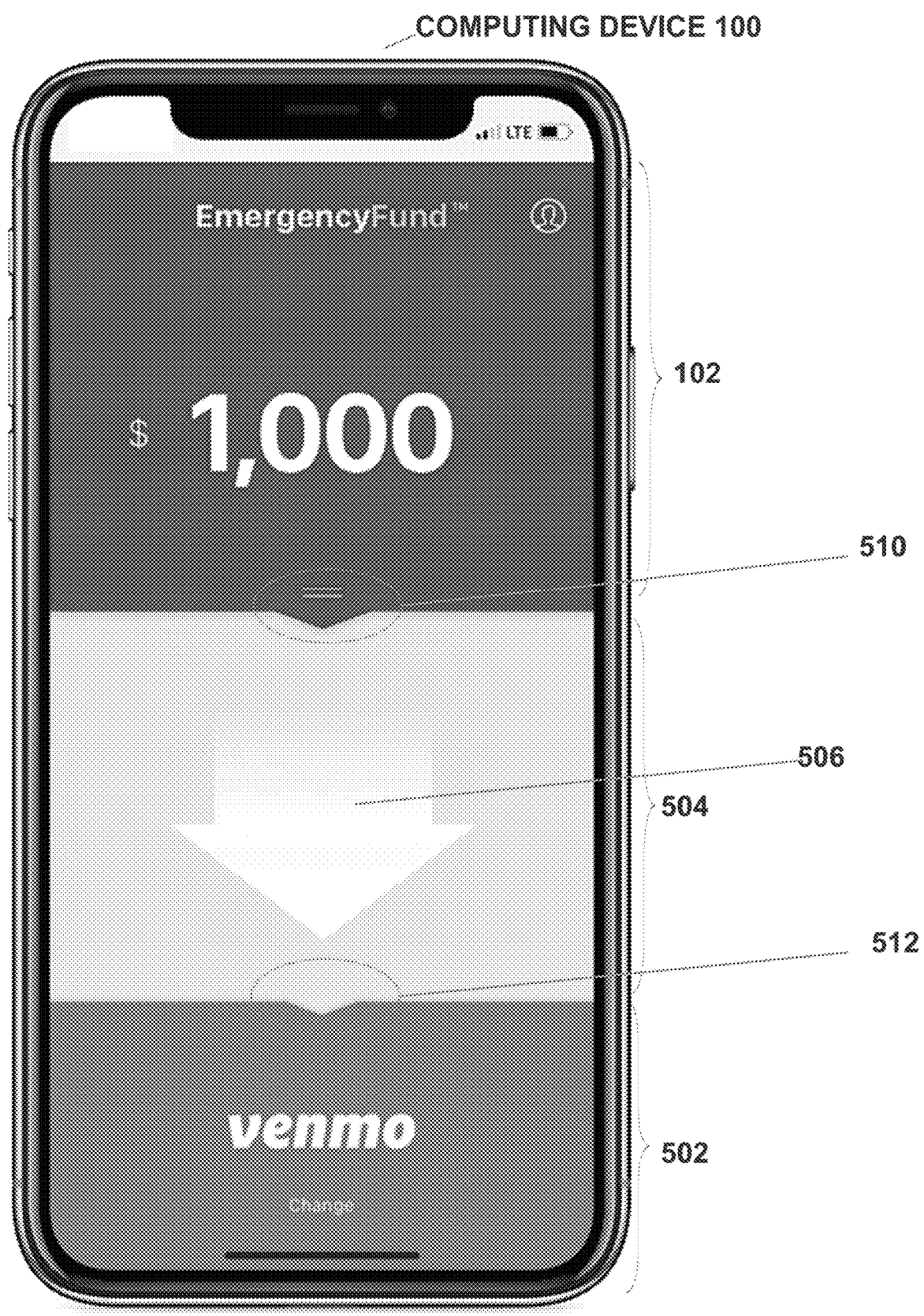
FIG. 5 is a block diagram of a computing device that is displaying an asset-transfer interface, according to an embodiment.

Referring to FIG. 5, it is a block diagram of an asset transfer interface, according to an embodiment. The interface includes the source indicator 102 as well as a target indicator 502. In the illustrated example, the target indicator indicates the target selected through the target selection controls discussed above.

Significantly, the source indicator 102 and the target indicator 502 are not adjacent to each other. Rather, a screen region 504 separates the source indicator 102 from the target indicator 502. The region 504 that separates the source indicator 102 from the target indicator 502 may be blank, or may have contents. In the illustrated embodiment, region 504 includes an arrow 506 that communicates the direction in which the source indicator 102 must be dragged in order to initiate an asset transfer operation.

Preferably, the edge of the source indicator 102 that faces the target indicator 502 and the edge of the target indicator 502 that faces the source indicator 102 are not merely straight lines. Rather, the edges mirror each other with protuberances on the one edge aligning with matching indentations on the other edge such that, when brought together, the edges are flush against each other.

In the embodiment illustrated in FIG. 5, the edge of source indicator 102 that faces target indicator 502 has a protuberance 510 shaped as a "V". Conversely, the edge of target indicator 502 that faces source indicator 102 includes an indentation 512 shaped as a "V". The sizes and shapes of protuberance 510 and indentation 512 are such that, when source indicator 102 is dragged to a position adjacent to target indicator 502, the adjacent boundaries of the two indicators are flush with each other.

In the illustrated embodiment, the source indicator 102 and the target indicator 502 have a "V" shaped protuberance and indentation, respectively. The "V" shaped protuberance provides a further indication of the direction in which the source indicator 102 must be dragged to trigger an asset transfer operation. However, in alternative embodiments, there may be any number of protuberances and indentations on each visual indicator. Regardless of the number, type, and shape of the protuberances and indentations, the shape of the facing boundaries is such that the boundaries "lock" with each other, allowing the opposing boundaries of the source and target indicators to become flush with each other when the source indicator 102 is dragged to a position adjacent to target indicator 502.

Referring to FIGS. 6A-6D, they are block diagrams illustrating opposing pairs of source/target indicators. As illustrated, the edge of the source indicator that faces the target indicator, and the edge of the target indicator that faces the source indicator, may assume a variety of non-linear shapes. One characteristic of the edges is that, when the source indicator is dragged to a position that is adjacent to the target indicator, the edges are flush with each other. That is, the edges are inverted mirrors of each other, where protuberances on one edge align with corresponding indentations of the same shape on the other edge. The edge shapes illustrated in FIGS. 6A-6D are merely examples, and the techniques described herein are not limited to any particular edge shapes.

Amount Adjustment Controls

Figure 7:
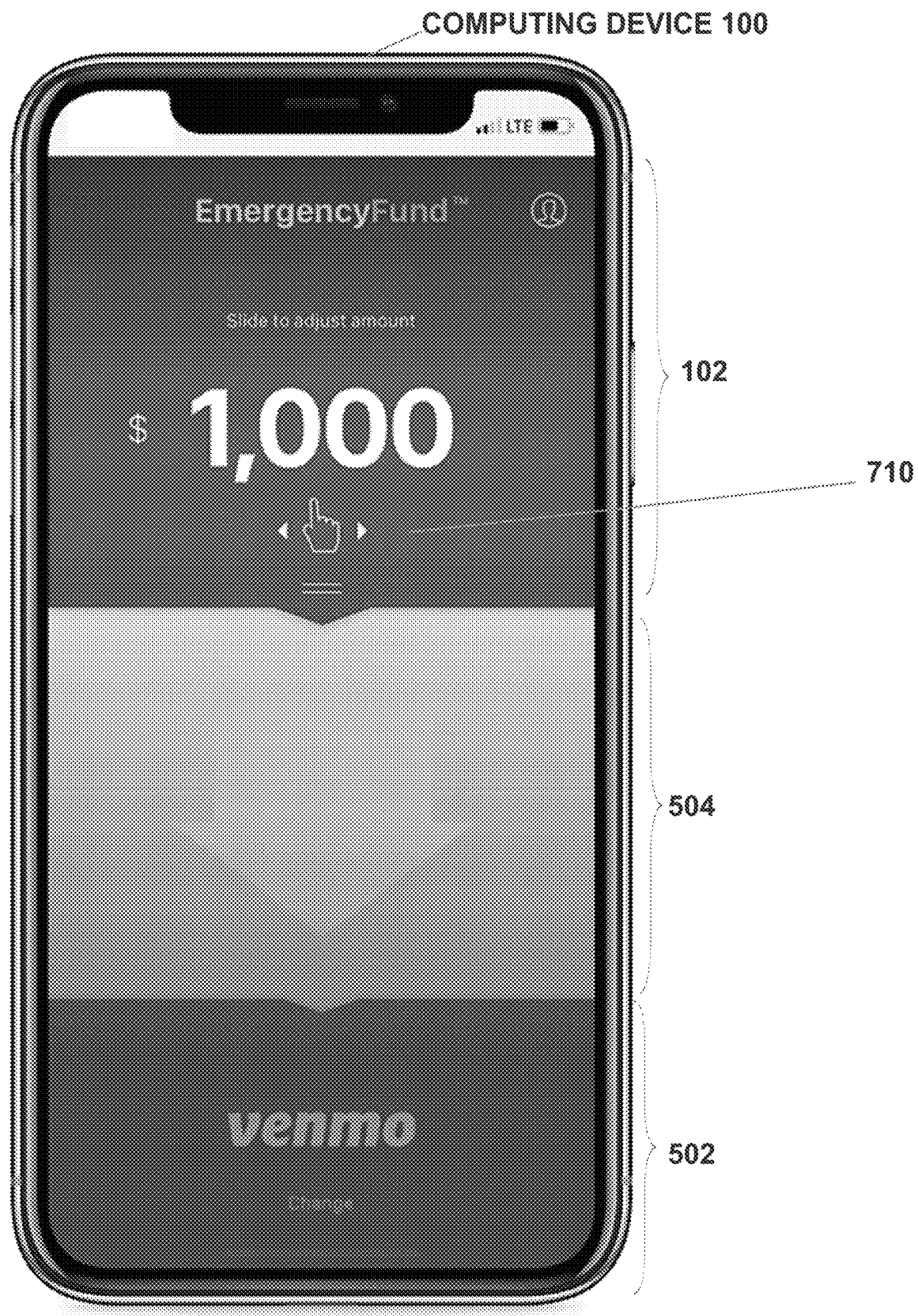
FIG. 7 is a block diagram of a computing device that includes a slide control for specifying the amount involved in the asset transfer, according to an embodiment.

According to one embodiment, the asset-transfer interface illustrated in FIG. 5 includes a control for adjusting the amount of the asset to be transferred. For example, referring to FIG. 7, while the asset-transfer interface is being displayed, a slide control 710 appears when the user selects a region within the source indicator 102. A leftward-drag operation on the slide control 710 reduces the amount of the transfer, while a rightward-drag operation on the slide control 710 increases the amount of the transfer. In one embodiment, while the selected amount is the total amount available from the selected source, further rightward-drag interactions will not increase the selected amount. In one embodiment, a rightward-drag interaction that occurs when the selected amount is the maximum available, the user may be presented with an interface for selecting a different source, or with instructions and/or controls for increasing the amount of the asset available for transfer.

Performing the Transfer

Figure 8:
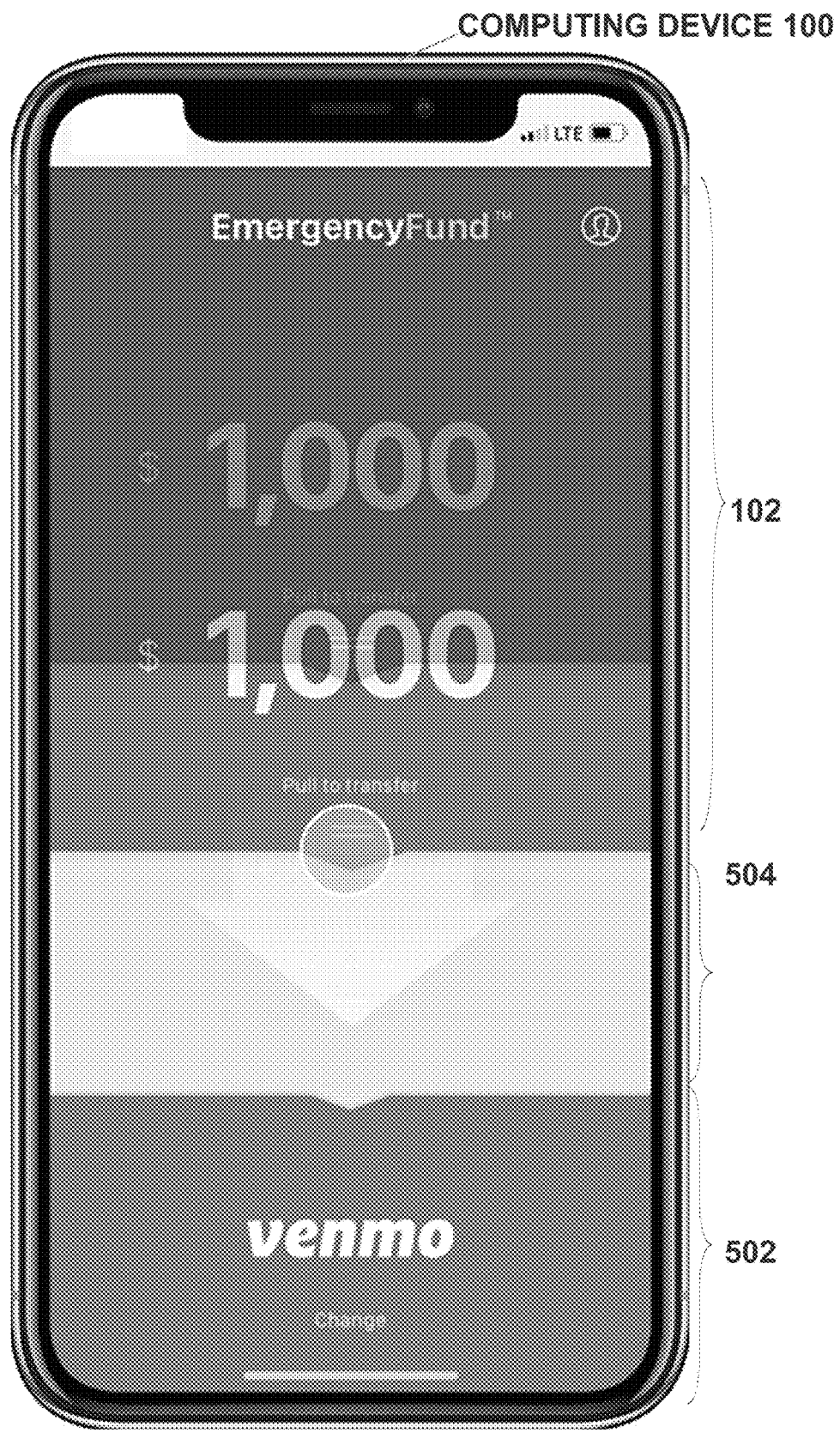
FIG. 8 is a block diagram of a computing device illustrating a state in which a user has begun dragging the edge of the source indicator towards the target indicator, according to an embodiment.

Once the desired amount has been set using the slice control 710, the asset transfer is performed using the asset-transfer interface by dragging the edge of the source indicator 102 that faces the target indicator 502 towards the target indicator 502, as illustrated in FIG. 8. In the illustrated embodiment, dragging the edge of the source indicator 102 enlarges the source indicator 102 while shrinking the region 504 between the indicators.

According to one embodiment, if the drag operation is ended before the edge of the source indicator 102 reaches the edge of the target indicator 502, the interface returns to the initial state illustrated in FIG. 5. On the other hand, if the edge is dragged until the edge of the source indicator 102 is adjacent to and flush with the edge of the target indicator 502, then the source indicator 102 "locks" to the target indicator 502 such that termination of the drag operation does not cause the asset-transfer interface to revert.

Figure 9:
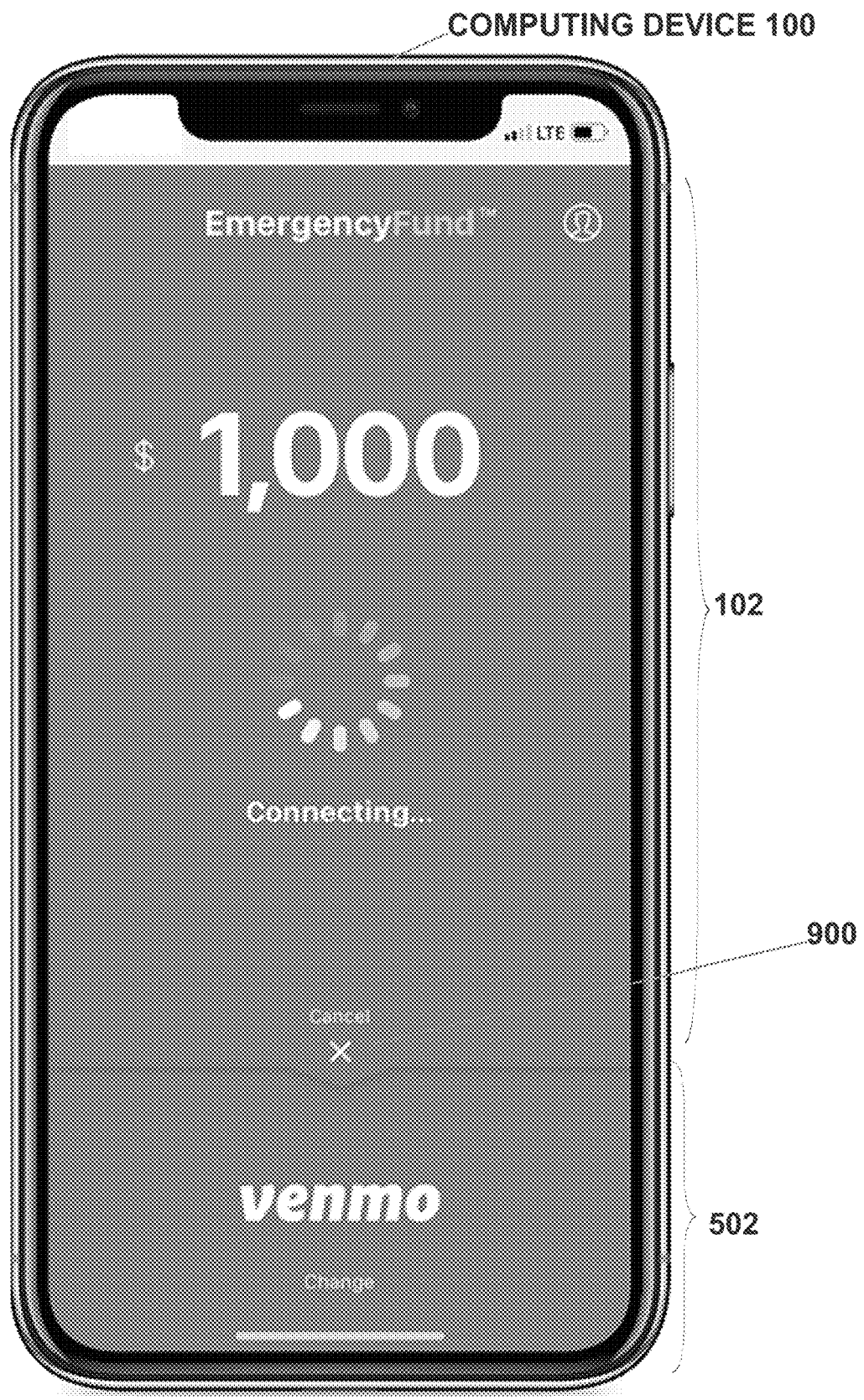
FIG. 9 is a block diagram of a computing device in a locked state after a user has dragged the edge of the source indicator to the edge of the target indicator, according to an embodiment.

Referring to FIG. 9, it illustrates an asset-transfer interface in which the source indicator 102 and the target indicator 502 are in the locked state. As mentioned above, once in the locked state, a user need not continue the dragging operation that caused the source indicator 102 to join with the target indicator 502. In addition to merely displaying the source indicator 102 adjacent to the target indicator 502, entering the locked state may produce additional interface changes. For example, in one illustrated embodiment, the color of the source indicator 102 changes to the color of the target indicator 502. In addition, a control 900 is displayed to allow the user to cancel the specified asset transfer. Cancelling the asset transfer causes the asset-transfer interface to revert to the unlocked state, as illustrated in FIG. 5.

Figure 10:
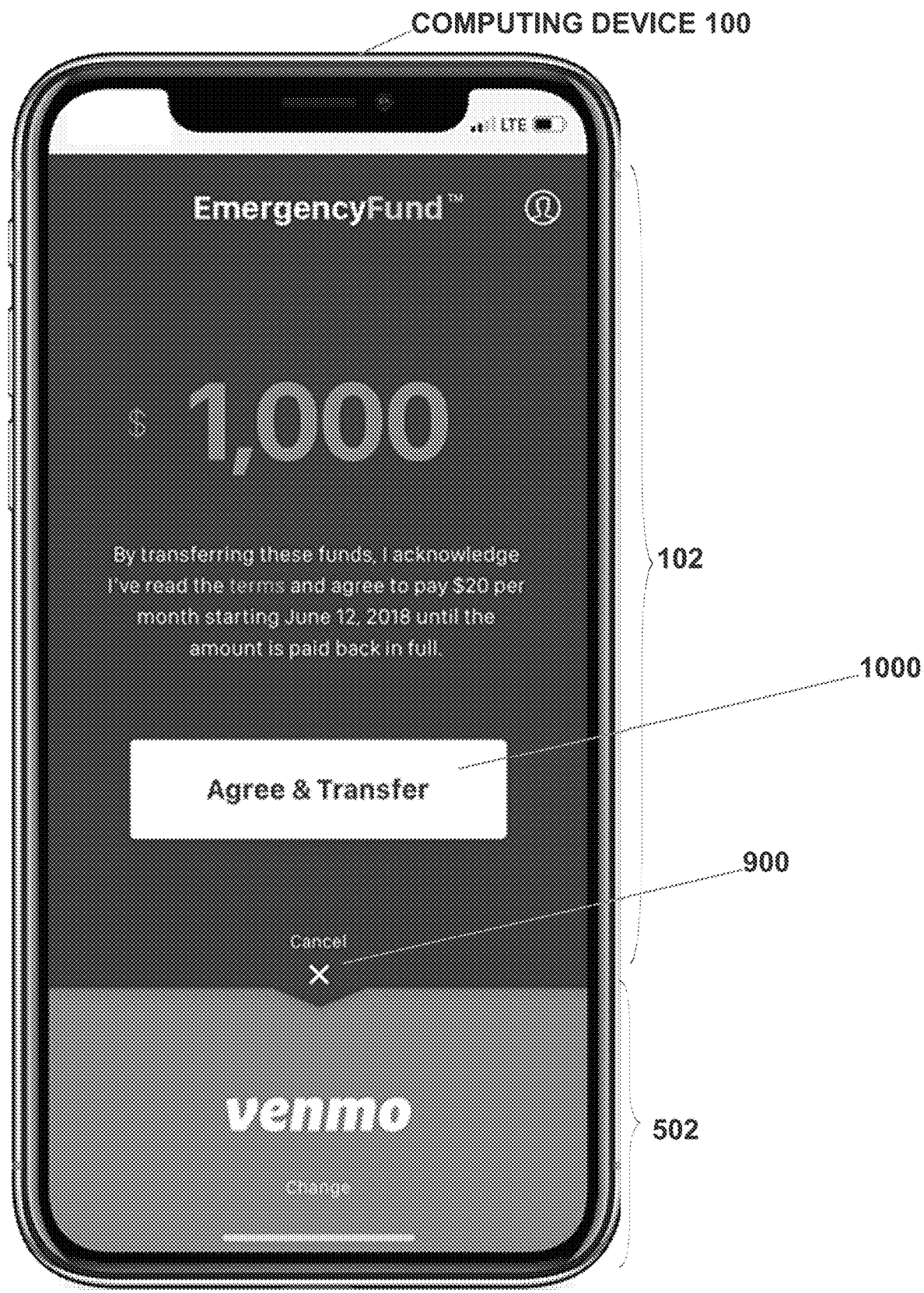
FIG. 10 is a block diagram of a computing device displaying a confirmation control after entering the locked state, according to an embodiment.
Figure 11:
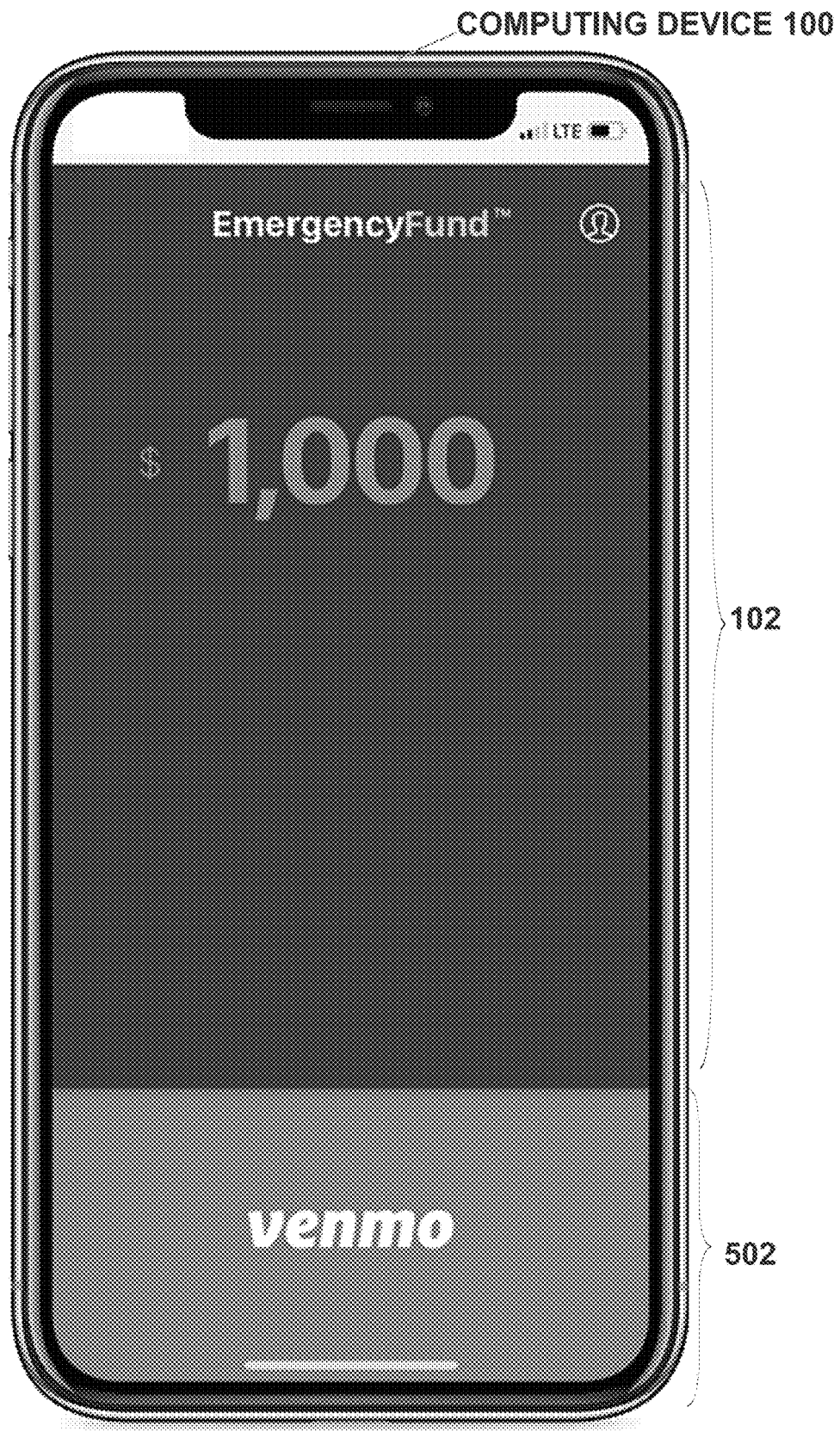
FIG. 11 is a block diagram of a computing device after activation of the confirmation control and immediately prior to the asset-transfer animation, according to an embodiment.

According to one embodiment, the asset transfer is initiated immediately upon entering the locked state of the asset-transfer interface. In an alternative embodiment, entering the locked state of the asset-transfer interface causes the application to prepare to perform the specified transfer, but the transfer itself it not performed until the user selects a confirmation control 1000, as illustrated in FIG. 10. When displaying the confirmation control 1000, the asset-transfer interface may display additional information, such as any terms that apply to the transfer operation. In the illustrated embodiment, the asset-transfer operation involves transferring funds that are made available by a loan that is created in response to the asset-transfer operation. Consequently, the asset-transfer interface displays information about the terms that apply to that loan.

Asset-Transfer Animation

According to one embodiment, once the asset-transfer has been initiated, the computing device displays an asset-transfer animation. At the start of the asset-transfer animation, the source indicator 102 is significantly larger than the target indicator 502. In addition, the source indicator 102 has a source counter that displays the full amount of the asset to be transferred.

During the asset-transfer animation, the size of the source indicator 102 shrinks while the size of the target indicator 502 grows. In one embodiment, in addition to changing the sizes of the indicators, a target counter is displayed on the target indicator 502. Initially, the target counter is zero, or the starting balance of the account represented by the target indicator 502. As the source indicator 102 shrinks, the source counter decrements. As the target indicator 502 grows, the target counter increments. By the end of the asset-transfer animation, the source counter reaches zero, and the target counter reaches the total amount of the transfer, or the starting balance plus the amount of the transfer.

Figure 12A:
FIGS. 12A-12C are block diagrams of intermediary states during the asset-transfer animation, according to an embodiment.
Figure 12B:
Figure 12C:
Figure 12D:
FIG. 12D is a block diagram of a computing device upon completion of the asset-transfer animation, according to an embodiment.

FIGS. 12A-12C are block diagrams that illustrate various intermediate stages during the asset-transfer animation. FIG. 12D illustrates the end display of the asset-transfer animation, where the source counter ceases to be displayed and the target counter has reached the total amount of the asset transfer.

Non-Transfer Uses

In the foregoing description, the drag-lock interface operation has been described in the context of an asset-transfer operation. However, in alternative embodiments, the pull-lock interface can be used in any situation where erroneously triggering an action could have severe consequences. For example, to accept a contact, an application may present a user with the pull-lock interface, where the user must pull one edge to another edge to enter a "locked" state, and then activate a confirmation control while the interface is in the locked state. Due to the nature of these interactions, and the two-phase process of triggering the action in question (lock then confirm), the chances of erroneously/ignorantly performing the action is significantly reduced.

Variations

While embodiments have been described where the activation is triggered by pulling one edge down to lock with another edge, the actual orientation of the edges may vary from implementation to implementation. For example, the pull-lock interface may involve dragging an edge upward to lock with another edge, sideways, to lock with another edge, diagonally to lock with another edge, etc. The techniques described herein are not limited to any particular pull direction.

In addition, while a confirmation control has been described in which activation involves selecting a button, any form of confirmation control maybe used. For example, the confirmation control may involve entering a security code, scanning a fingerprint, a face (for face recognition), or an eye. These are merely examples in which a confirmation control may be activated, and the techniques described herein are not limited to any particular method of specifying confirmation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
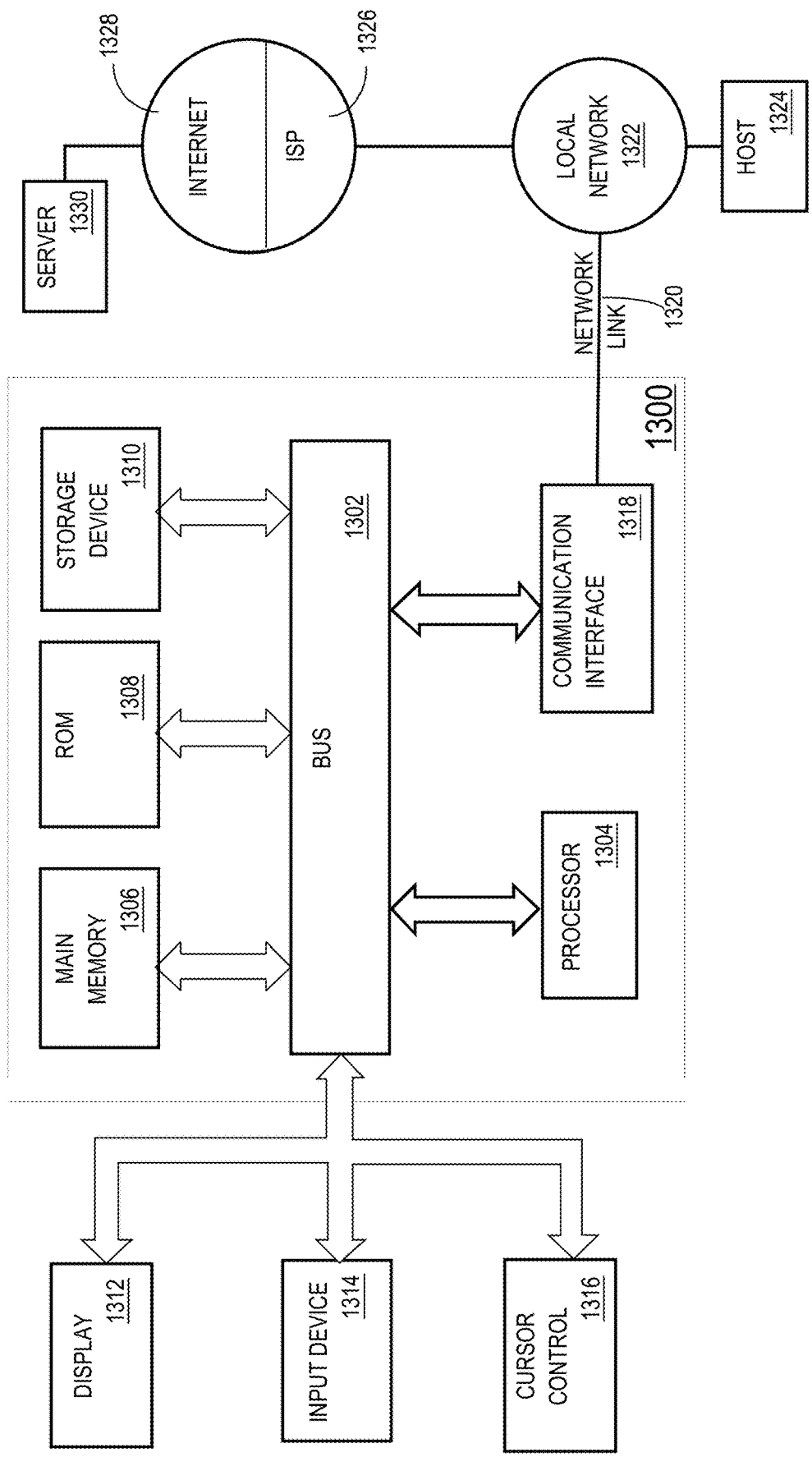
FIG. 13 is a block diagram of a computer system upon which the techniques described herein may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    displaying on a display of a computing device:
        a source indicator;
        a target indicator; and
        a region that separates the source indicator and the target indicator;
    wherein the source indicator has a first edge that faces the target indicator;
    wherein the target indicator has a second edge that faces the source indicator;
    receiving user input that performs a dragging operation in which the first edge is dragged towards the second edge;
    responsive to the first edge reaching second edge in the dragging operation, performing the steps of:
        entering a locked state in which the first edge remains adjacent to the second edge when dragging operation ceases; and
        performing one of:
            initiating a transfer operation that transfers an asset from a source indicated by the source indicator to a target indicated by the target indicator, or
            displaying a confirmation control that requests confirmation of a transfer operation from the source indicated by the source indicator to the target indicated by the target indicator, wherein activation of the confirmation control initiates the transfer operation that transfers the asset from the source indicated by the source indicator to the target indicated by the target indicator;
    wherein the method is performed by the computing device.

2. The method of claim 1 wherein, responsive to the first edge reaching the second edge in the dragging operation, the transfer operation is immediately initiated.

3. The method of claim 1 wherein, responsive to the first edge reaching the second edge in the dragging operation, the confirmation control is displayed without immediately initiating the transfer operation.

4. The method of claim 3 wherein activation of the confirmation control creates a loan that serves as the source for the transfer operation.

5. The method of claim 1 further comprising, after initiating the transfer operation, generating an asset-transfer animation in which the size of the target indicator increases and the size of the source indicator decreases.

6. The method of claim 5 further comprising, during the asset-transfer animation:
    displaying a source counter on the source indicator and a target counter on the target indicator;
    causing the source counter to decrement while the size of the source indicator decreases; and
    causing the target counter to increment while the size of the target indicator increases.

7. The method of claim 6 wherein causing the source counter to decrement includes causing the source counter to decrement starting from a number that represents an amount involved in the transfer operation and ending at zero.

8. The method of claim 6 wherein causing the target counter to increment includes causing the target counter to increment starting from zero and ending at a number that represents an amount involved in the transfer operation.

9. The method of claim 6 wherein causing the target counter to increment includes causing the target counter to increment starting from a starting balance associated with the target and ending at a number that represents the sum of the starting balance and an amount involved in the transfer operation.

10. The method of claim 1 further comprising, after initiating the transfer operation, generating an asset-transfer animation;
    during the asset-transfer animation:
        displaying a source counter on the source indicator and a target counter on the target indicator;
        causing the source counter to decrement; and
        causing the target counter to increment.

11. The method of claim 1 wherein:
    the first edge and the second edge are non-linear;
    the first edge and the second edge are shaped such that the first edge is flush with the second edge when in the locked state.

12. The method of claim 11 wherein the second edge has one or more protuberances and the second edge has one or more indentations that mirror the one or more protuberances.

13. The method of claim 12 wherein the one or more protuberances includes at least one "V"-shaped protuberance that points towards the second edge to serve as a visual hint as to the direction towards which the first edge is to be dragged to trigger that transfer operation.

14. The method of claim 1 wherein:
    prior to the dragging operation, the display is in a first state in which the source indicator and the target indicator are separated by the region; and
    if the dragging operation is terminated before the first edge reaches second edge, then the display reverts to the first state.

15. A method comprising:
    displaying on a display of a computing device:
        a first region having a first edge;
        a second region having a second edge that is facing the first edge; and a region that separates the first edge from the second edge;

receiving user input that performs a dragging operation in which the first edge is dragged towards the second edge;

responsive to the first edge reaching second edge in the dragging operation, performing the steps of:

entering a locked state in which the first edge remains adjacent to the second edge when dragging operation ceases;

displaying a confirmation control that requests confirmation of an operation; and responsive to activation of the confirmation control, performing the operation;

wherein the method is performed by the computing device.

16. One or more non-transitory computer-readable media storing instructions which, when executed by a computing device, cause:

displaying on a display of the computing device:

a source indicator;

a target indicator; and a region that separates the source indicator and the target indicator;

wherein the source indicator has a first edge that faces the target indicator;

wherein the target indicator has a second edge that faces the source indicator;

receiving user input that performs a dragging operation in which the first edge is dragged towards the second edge;

responsive to the first edge reaching second edge in the dragging operation, performing the steps of:

entering a locked state in which the first edge remains adjacent to the second edge when dragging operation ceases; and performing one of:

initiating a transfer operation that transfers an asset from a source indicated by the source indicator to a target indicated by the target indicator, or displaying a confirmation control that requests confirmation of a transfer operation from the source indicated by the source indicator to the target indicated by the target indicator, wherein activation of the confirmation control initiates the transfer operation that transfers the asset from the source indicated by the source indicator to the target indicated by the target indicator.

17. One or more non-transitory computer-readable media storing instructions which, when executed by a computing device, cause:

displaying on a display of the computing device:

a first region having a first edge;

a second region having a second edge that is facing the first edge; and a region that separates the first edge from the second edge;

receiving user input that performs a dragging operation in which the first edge is dragged towards the second edge;

responsive to the first edge reaching second edge in the dragging operation, performing the steps of:

entering a locked state in which the first edge remains adjacent to the second edge when dragging operation ceases;

displaying a confirmation control that requests confirmation of an operation; and responsive to activation of the confirmation control, performing the operation.

* * * * *